(12) United States Patent
Parker

(10) Patent No.: US 7,080,539 B2
(45) Date of Patent: Jul. 25, 2006

(54) FORGED KNURLED SOCKET HOUSING AND METHOD OF MANUFACTURE

(75) Inventor: Glen C. Parker, St. Peters, MO (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 11/018,765

(22) Filed: Dec. 21, 2004

(65) Prior Publication Data

US 2005/0132769 A1     Jun. 23, 2005

Related U.S. Application Data

(60) Provisional application No. 60/531,826, filed on Dec. 22, 2003.

(51) Int. Cl.
*B21K 1/26* (2006.01)

(52) U.S. Cl. ................................. 72/358; 29/898.048

(58) Field of Classification Search .............. 72/354.6, 72/354.8, 358, 359; 29/898.048
See application file for complete search history.

(56) References Cited

U.S. PATENT DOCUMENTS

| 478,525 A | * | 7/1892 | Sanders ..................... 72/267 |
| 2,216,201 A | | 10/1940 | Keller .................... 29/155.55 |
| 2,733,085 A | | 1/1956 | Latzen ........................ 287/87 |
| 3,241,226 A | | 3/1966 | Jorgji ......................... 29/441 |
| 3,337,247 A | | 8/1967 | Moskovitz ................... 287/90 |
| 3,613,201 A | | 10/1971 | Herbenar ............... 29/149.5 B |
| 3,731,516 A | | 5/1973 | Dohmann et al. ........... 72/354 |
| 4,166,372 A | | 9/1979 | Knight ........................ 72/348 |
| 4,256,413 A | | 3/1981 | Abe ........................... 403/282 |
| 4,666,665 A | * | 5/1987 | Hornsby et al. .............. 419/48 |
| 5,538,566 A | * | 7/1996 | Gallagher, Jr. ............. 148/584 |
| 5,553,476 A | | 9/1996 | Oehy et al. .................. 72/525 |
| 5,867,901 A | * | 2/1999 | Noda et al. .............. 29/893.34 |
| 6,438,844 B1 | * | 8/2002 | Nolden .................. 29/898.066 |

FOREIGN PATENT DOCUMENTS

JP          06262291 A       9/1994

* cited by examiner

*Primary Examiner*—Lowell A. Larson
(74) *Attorney, Agent, or Firm*—Dickinson Wright PLLC

(57) ABSTRACT

A method for manufacturing a cartridge-type housing for a ball and socket joint in a vehicular suspension system comprises the steps of inserting a housing blank into a forging tool die, expanding the housing blank within the forging tool die using a forging tool punch, and forming knurls on an exterior surface of the housing during the expanding step. The ball and socket joint assembly thus formed comprises a housing having an interior socket and an exterior surface at least partially knurled for press fit into a mating first suspension part, such as a control arm. A ball is rotatably seated within the socket to provide an articulating joint. A mounting shank extends from the ball, outwardly from the housing, for attaching to a second suspension component, such as a suspended wheel. The housing, together with its knurls, is formed in a forging tool. As distinguished from the prior art technique of machining, knurls formed in the forging process allow economical, high-volume production. In addition, the forging technique allows greater design flexibility to place knurls in surface configurations previously unattainable or impractical with conventional machining techniques.

9 Claims, 3 Drawing Sheets

FORGED KNURLED SOCKET HOUSING AND METHOD OF MANUFACTURE

CROSS-REFERENCE TO RELATED APPLICATIONS

This patent application claims priority to U.S. Provisional Patent Application No. 60/531,826 filed Dec. 22, 2003.

FIELD OF THE INVENTION

The subject invention relates to an improved ball joint for a vehicular suspension, and a method of making the same using a forging process.

RELATED ART

In automotive suspension applications, a ball and socket joint, or more commonly a "ball joint assembly" is used in various locations to moveably support steering and wheel components. Ball joint assemblies include at one end a protruding stud that is either taper fit or otherwise secured to a mating feature. The stud carries a generally spherical ball that is captured in a housing to provide a socket for the articulating joint. The housing, in turn, is attached to a respective mating feature, such as a control arm or other suspension component.

Within the variety of housing attachment methods and configurations, there exists the so-called "cartridge-type" housing which is characterized by a press fit into the mating part. In order to improve the fit between the housing and the mating part, the exterior surface of the housing may include knurls configured to engage a receiving surface in the mating part. A knurl is a surface feature of small ridges or knobs to ensure a firm grip. The mating part typically has a smooth, cylindrical receiving surface, and the fine knurls in the housing bite into the sides of this receiving surface to concentrate the interacting forces over discrete points or lines so as to improve retention of the housing in the mating part.

Examples of prior art cartridge-type housings with knurled exterior may be found in U.S. Pat. Nos. 3,337,247 and 4,256,413. These housings are manufactured in a multi-step process. First, the housing is formed using a forging process, which is well known as a technique where compressive force is applied between opposing dies to shape metal by plastic deformation. Forging is typically used as the first manufacturing step because it is economical when deployed over large volume production runs. Also, forging can provide certain metallurgical benefits, since it involves a controlled deformation of the metal material at either cold or hot temperatures.

In the case of cartridge-type housings with knurls, the forged housing is then transferred to a separate operation where the knurls are introduced by either rolling or cutting into the exterior surface with a machining tool. This additional step of forming the knurls into the exterior of the forged housing adds cost and time to the production process. As a result, knurled housings are not suitable for high-volume production applications. Hence, the use of knurls on a cartridge-type housing is typically restricted to low volume productions where it is cost-effective to produce the product in the described two-step operation, or in a single, all-machining, operation.

In addition to the high cost associated with machine-formed knurls, there are other inherent disadvantages. For example, machined knurls cannot be cut into all surface configurations. By way of illustration, it is difficult to provide knurling into inside corners due to insufficient clearance for the cutting or rolling tools. So that when knurling is desired adjacent a perpendicular shoulder surface, the knurls must be stopped a good distance away from the shoulder surface. Sometimes, it is necessary to provide an undercut adjacent the shoulder to accommodate material flowed toward the inside corner such as during a rolling process. Thus, the use of machine-formed knurls limits the design opportunities for cartridge-type housings. Other disadvantages of machine-formed knurls can include a disruption in the material hardness between root and crest of the knurls, higher stress concentrations at the root of the knurls, and an increased susceptibility to corrosion as compared with other surface areas of the housing.

A low cost method to produce a knurled cartridge-type housing of commercially robust quality is not currently available. One prior art attempt to form a cartridge-type housing using a sheet material stamping operation is shown in U.S. Pat. No. 3,613,201. Although stamping could be more economical for high-volume applications, stamped sheet material is limited in applicability due to its narrow range of achievable design shapes and strengths as compared with forged or even machined cartridge-type housings. Among those skilled in the art, stamping is not considered for commercial applications.

Accordingly, a low cost method to produce a knurled cartridge-type housing of commercially robust quality, with greatly expanded shape design opportunities and the absence of concerns of the type inherent with machine-formed knurls, would be advantageous.

BRIEF SUMMARY OF THE INVENTION

The invention overcomes the disadvantages and shortcomings of the prior art by providing a method for manufacturing a cartridge-type housing for a ball and socket joint in a vehicular suspension system. The method comprises the steps of inserting a housing blank into a forging tool die, expanding the housing blank within the forging tool die using a forging tool punch, and forming knurls on an exterior surface of the housing during the expanding step. As suggested above, the forging process allows high-volume production of knurled ball joint housings in a more economical manner, as well as greater design flexibility and metallurgical properties than heretofore attainable via prior art techniques.

According to another aspect of the invention, a ball and socket joint assembly for a vehicular suspension is contemplated. The assembly comprises a housing having an interior socket and an exterior surface at least partially knurled for press fit into a mating first suspension part. A ball is rotatably seated within the socket to provide an articulating joint. A shank extends from the ball, outwardly from the housing, for attaching to a second suspension component. The housing includes an uninterrupted negative impression of a forging die distributed uniformly over the exterior surface and the knurls. As distinguished from the prior art technique of machining, knurls formed in a forging process, by which the negative impression of the forging die is achieved, allow high-volume production of knurled ball joints in a more economical manner. In addition, the forging technique allows greater design flexibility to place knurls in surface configurations previously unattainable or impractical with conventional machining techniques. Forging also produces knurls with a substantially uninterrupted material hardness between root and crest and generally consistent stress concentrations at the root of the knurls (compared with machined knurls).

Yet another aspect of the invention provides for an improved ball joint housing forging tool die configured to control formation of the exterior surface of a ball joint housing. The forging die comprises a forging die body, an inner circumference formed within the forging die body, and a plurality of knurls disposed at least partially about the inner circumference. The knurls are configured to form a corresponding plurality of mirror image knurls on an exterior surface of a forged ball joint housing during a forging process. The subject forging tool die blank enables high-volume production of knurled ball joint housings in a more economical manner, as well as greater design flexibility and metallurgical properties than heretofore attainable via prior art tooling and manufacturing techniques.

These and other advantages of the invention will be more fully appreciated by reference to the accompanying drawings and detailed technical description.

BRIEF DESCRIPTION OF THE DRAWINGS

These and other features and advantages of the present invention will become more readily appreciated when considered in connection with the following detailed description and appended drawings, wherein.

DESCRIPTION OF THE PREFERRED EMBODIMENT

Figure 1:
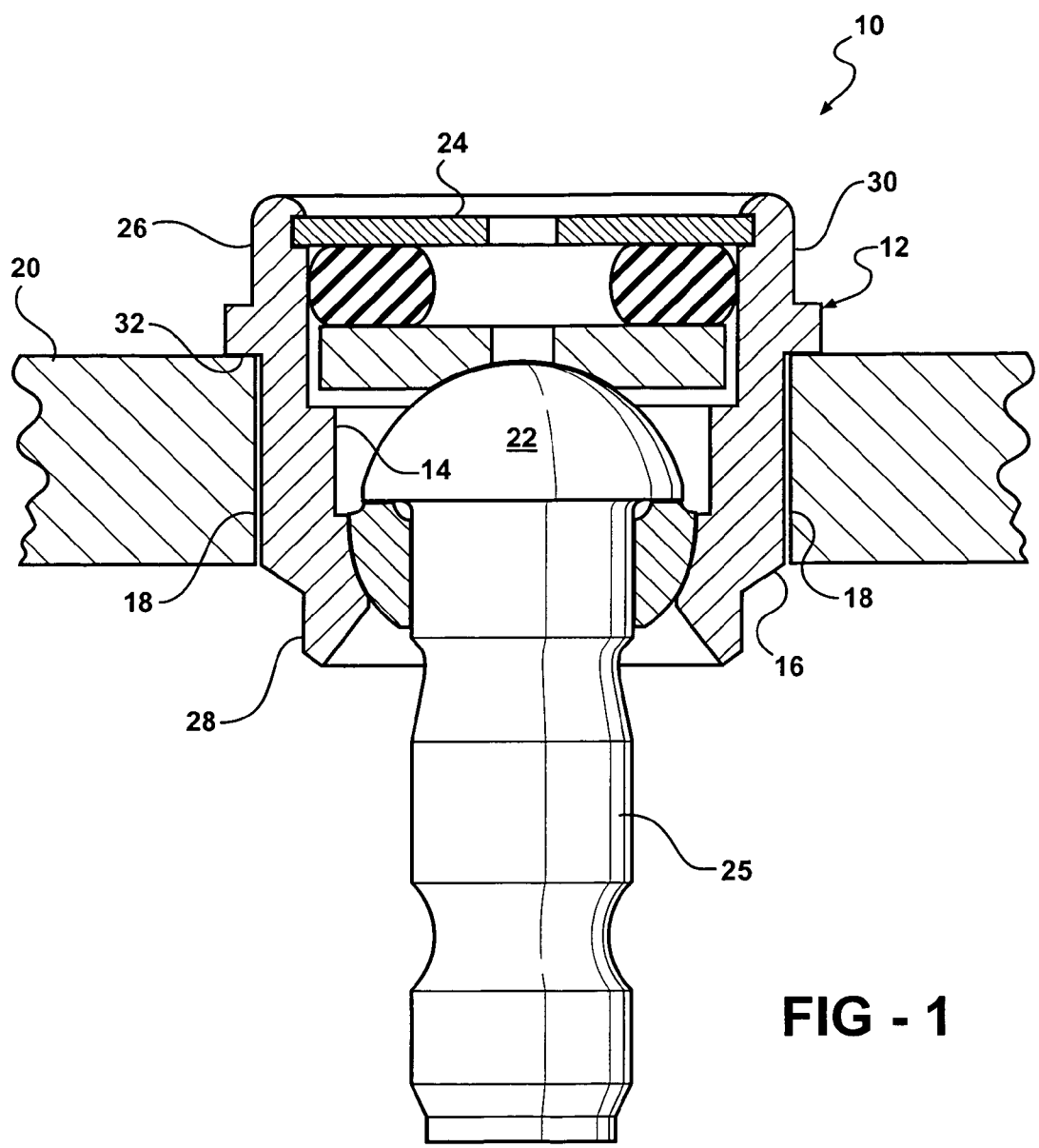
FIG. 1 is a partially sectioned ball joint assembly according to the subject invention press fit into a mating suspension part of a vehicle.

Referring to the Figures, wherein like numerals indicate like or corresponding parts throughout the several views, a ball joint assembly is generally shown at 10 in FIG. 1. The assembly 10 is of the type adapted for use in a vehicular suspension and steering linkages. The assembly 10 includes a cartridge-type housing, generally indicated at 12, having an interior socket 14 and an exterior surface 16 at least partially knurled 18 for press fit into a mating first suspension part 20. Although illustrated herein with the knurls 18 extending in an uninterrupted circumference about the housing 12, the knurls 18 may be located in discrete clusters with non-knurled regions between each cluster. The first suspension part 20 may be a lateral swinging arm that controls the camber of a wheel, i.e., a control arm, or other steering, sway or support linkage of the type found in undercarriage features.

A ball 22 is rotatably seated within the socket 14. The ball 22 is generally spherical and may be fabricated as a single solid member, or from two pieces as shown in the FIG. 1.

The interior socket 14 of the housing 12 includes a frusto-spherical portion 23 which provides an arcuate running surface against which the ball 22 journals. Depending upon the application, a full spherical profile may not be required, and in these situations the ball 22 can take the shape of a half sphere. The ball 22 is captured in the housing 12 by a cover plate 24 in any one of the typical manners. Washers, springs, or other packing and lubrication materials can be trapped in the housing 12, between the ball 22 and the cover plate 24, depending upon the application. A shank 25 is fixedly joined to the ball 22 and extends outwardly from the housing 12 for attaching to a second suspension component (not shown). The shank 25 may be in the designed for a taper fit second suspension part, or secured thereto by a threaded nut configuration.

The exterior surface 16 of the housing 12 includes a non-knurled portion 26 in addition to the knurled portion 18. The non-knurled portion 26, in the examples illustrated in the Figures, includes a necked bottom region 28 and an enlarged upper region 30. A shoulder 32 interface between the upper region 30 and the knurls 18 extends generally perpendicular to the knurls 18. A design feature not previously attainable via prior art machining techniques, the knurls 18 are formed contiguous the shoulder 32.

This and other unique aspects of the subject invention are attributable to the use of forging as a manufacturing methodology for the housing 12, including formation of its knurls 18. The forging process, which may be characterized by the application of overwhelming compressive force between opposing dies to shape the metallic housing 12 by plastic deformation, is unique among other manufacturing techniques in that it leaves an uninterrupted negative impression of the female forging die distributed uniformly over the exterior surface 16 and the knurls 18. In addition, the forging process leaves an uninterrupted negative impression of the male forging die distributed uniformly over the interior socket 14 of the housing 12.

Figure 3:
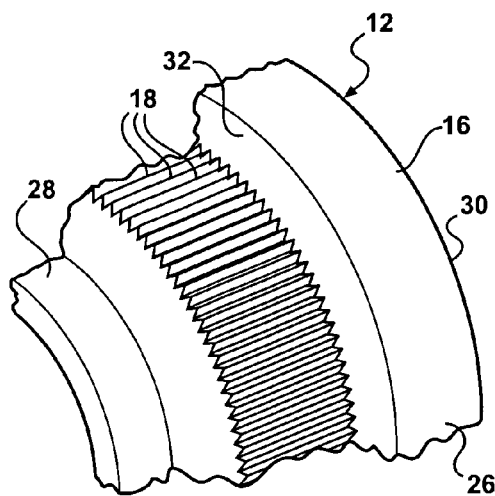
FIG. 3 is a fragmentary perspective view of a forged ball joint housing according to the subject invention.
Figure 4:
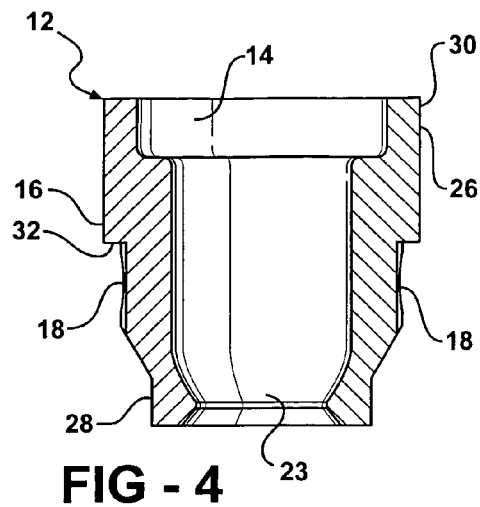
FIG. 4 is a cross-sectional view of a ball joint housing according to the subject invention.
Figure 5:
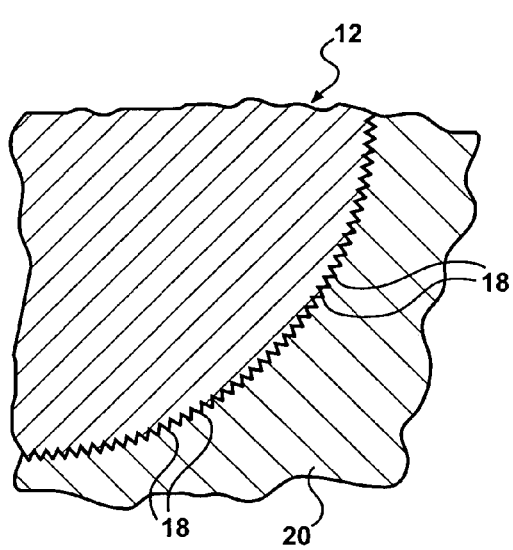
FIG. 5 is an enlarged, quarter-section of a knurled ball joint housing press fit into a mating suspension part of a vehicle.

As can perhaps best be seen in FIGS. 3 and 5, each of the knurl 18 has a longitudinal length and a generally triangular cross-section in directions perpendicular to the longitudinal length. In this manner, the knurls 18 are well suited to press fit into a receiving hole in the mating first suspension part 20. The knurls 18 improve the fit between the housing 12 and the first suspension part 20 by biting into the sides of the receiving hole to concentrate the interacting forces over discrete points or lines. Thus, the housing 12 stays in place even during extremely harsh conditions.

Figure 6:
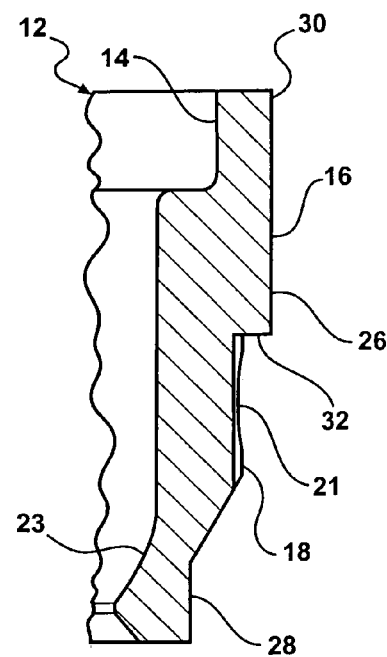
FIG. 6 is a fragmentary cross-sectional view of the housing showing an alternative knurl configuration in which a central depressed area is provided along the length of each knurl.

In an alternative embodiment shown in FIG. 6, the knurls 18 may have a depressed central region 21 to enhance the grip in the mating first suspension part 20. This and other non-uniform knurl 18 configurations are possible in light of the subject forging technique.

Figure 2C:
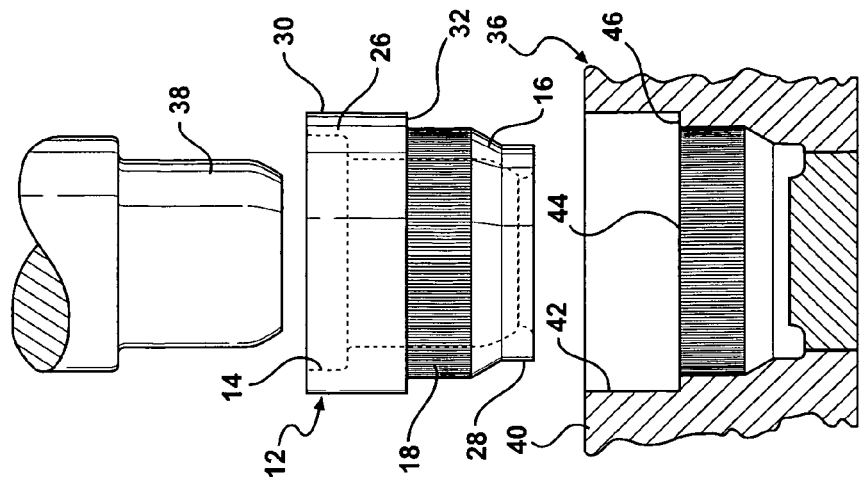
FIGS. 2A–2C illustrate a manufacturing sequence of forging a housing blank into a finished housing including a knurled exterior surface.
Figure 2B:
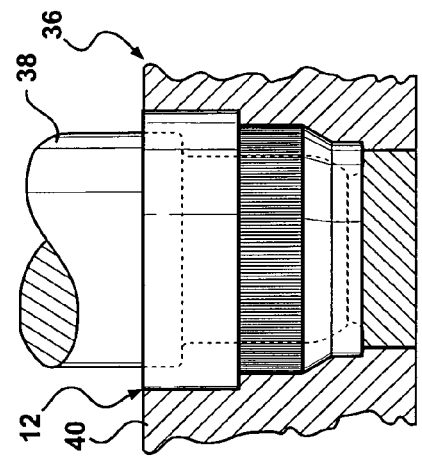
Figure 2A:
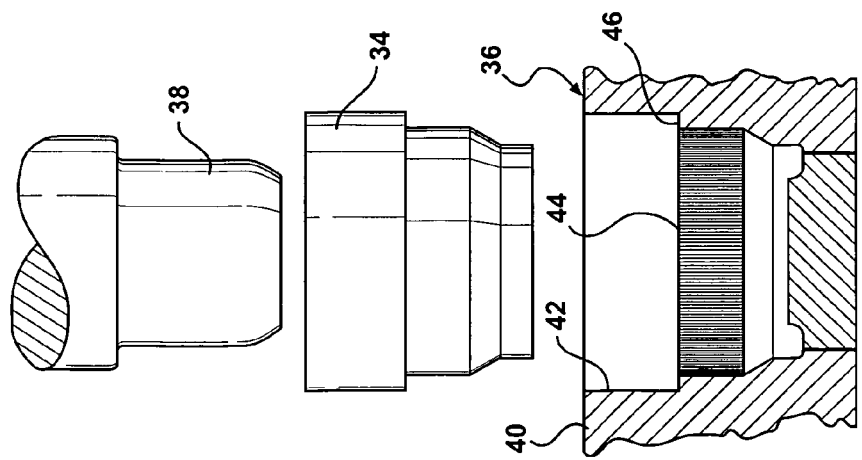

FIGS. 2A, 2B, and 2C illustrate the subject process for manufacturing a cartridge-type housing 12 for a ball and socket joint assembly 10 adapted for use in a vehicular suspension system. The method comprises the steps of inserting a housing blank 34 into a female forging tool die 36, deforming (via expanding and/or extruding) the housing blank 34 within the forging tool die 36 using a male forging tool punch 38, and forming knurls 18 on the exterior surface 16 of the housing 12 during the expanding/extruding step. The diameter or surface of the blank 34 may be larger than the internal diameter of the die 36 such as to produce an interference with the die 36. Those skilled in the art will appreciate that either a single-stage forming operation or a progressive forming operation, i.e., where multiple forming dies are used to successively deform the blank 34 toward its final shape, may be used. Also, depending upon many factors, the housing blank 34 can either be heated above ambient temperature during the expanding step (i.e., hot forging) or maintained at generally ambient temperature during the expanding step (i.e., cold forging), or a combination of hot shaping steps, followed by final cold shaping and/or coining. The control of the movement of the forging tool die 36 and punch 38 may be handled by a computer configured with suitable software to regulate movement of the tools and the forces exerted.

The non-knurled portion 26 on the exterior surface 16 of the housing 12 is simultaneously formed with the knurls 18, thus efficiently and economically creating the housing 12. This includes simultaneous forming of the shoulder 32 and all other internal and external features of the housing 12.

Referring again to the forging tool die 36 and FIGS. 2A–2C, the forging die 36 has been configured to control formation of the exterior surface 16 of the ball joint housing 12. The die 36 comprises a forging die body 40, an inner circumference 42 formed within the forging die body 40, and a plurality of knurls 44 disposed at least partially about the inner circumference 42. The knurls 44 in the die 36 are configured to form a mirror image plurality of knurls 18 on the exterior surface 16 of the forged ball joint housing 12 during the forging process.

The inner circumference 42 of the die body 40 includes a surface texture, and the knurls 44 have a surface texture substantially similar to the surface texture of the inner circumference 42 so that a uniform texture is imparted to the finished housing 12. Of course, the inner circumference 42 of the die body 36 also includes a non-knurled portion to generate the corresponding non-knurled portion 26 on the finished housing 12. Likewise, the inner circumference 42 also includes a shoulder 46 contiguous to the knurls 44 and configured to form a mirror image shoulder 32 on the exterior surface 16 of the forged ball joint housing 12 during the forging process.

In view of the above, it will be understood that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A method for manufacturing a cartridge-type housing for a ball and socket joint in a vehicular suspension system, said method comprising the steps of:
   inserting a housing blank into a forging tool die;
   deforming the housing blank within the forging tool die using a forging tool punch, said deforming step comprising exerting a continuous linear force causing the housing blank to flow under compression; and
   forming knurls on an exterior surface of the housing during said deforming step.

2. The method of claim 1 further including the step of heating the housing blank above ambient temperature during said expanding step.

3. The method of claim 1 further including the step of maintaining the housing blank at generally ambient temperature during said expanding step.

4. The method of claim 1 wherein said deforming step includes a plurality of progressive forming procedures each successively expanding the blank toward a final shape.

5. The method of claim 1 further including the step of forming a non-knurled portion on the exterior surface of the housing simultaneously with said step of forming knurls.

6. The method of claim 5 wherein said step of forming a non-knurled portion includes forming a shoulder contiguous to the knurls.

7. An improved ball joint housing forging die tool configured to control formation of the exterior surface of a ball joint housing, said die comprising:
   a forging die body;
   an inner circumference formed within said forging die body, said inner circumference including a non-knurled portion;
   a plurality of knurls disposed at least partially about said inner circumference and adjacent said non-knurled portion, said knurls configured to form a mirror image plurality of complementary knurls on an exterior surface of a forged ball joint housing during a forging process; and
   wherein said non-knurled portion of said inner circumference includes an overhanging shoulder contiguous to said knurls configured to form a mirror image shoulder overhanging the complementary formed knurls on the exterior surface of the forged ball joint housing during the forging process.

8. A forging die as set forth in claim 7 wherein said inner circumference of said die body includes a surface texture, and said knurls have a surface texture substantially similar to said surface texture of said inner circumference.

9. A forging die as set forth in claim 7 wherein each of said knurls have a longitudinal length and a generally triangular cross-section in directions perpendicular to said longitudinal length.

* * * * *